US010985978B2

(12) United States Patent
Sarda et al.

(10) Patent No.: US 10,985,978 B2
(45) Date of Patent: Apr. 20, 2021

(54) SYSTEM AND METHOD FOR FIRST TIME AUTOMATIC ON-BOARDING OF WI-FI ACCESS POINT

(71) Applicant: ARRIS Enterprises LLC, Suwanee, GA (US)

(72) Inventors: Harin D. Sarda, Bangalore (IN); Aravind Venugopal, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/184,988

(22) Filed: Nov. 8, 2018

(65) Prior Publication Data

US 2020/0153686 A1 May 14, 2020

(51) Int. Cl.

*G06F 15/177* (2006.01)
*H04L 12/24* (2006.01)
*H04W 12/06* (2021.01)
*H04W 40/24* (2009.01)
*H04W 84/12* (2009.01)
*H04W 88/08* (2009.01)

(52) U.S. Cl.

CPC ...... *H04L 41/0806* (2013.01); *H04L 41/0813* (2013.01); *H04W 12/06* (2013.01); *H04W 12/0608* (2019.01); *H04W 40/244* (2013.01); *H04W 84/12* (2013.01); *H04W 88/08* (2013.01)

(58) Field of Classification Search

CPC ........... H04L 41/0806; H04L 41/0813; H04W 12/0608; H04W 12/06; H04W 40/244; H04W 84/12; H04W 88/08

USPC .......................................................... 709/222

See application file for complete search history.

(56) References Cited

U.S. PATENT DOCUMENTS

2007/0254614 A1 11/2007 Muralidharan et al.
2013/0272164 A1 10/2013 Leonardos et al.
2016/0143069 A1 5/2016 Xie et al.
2017/0134365 A1 * 5/2017 Li ........................ H04L 63/083

OTHER PUBLICATIONS

PCT International Search Report & Written Opinion, RE: Application No. PCT/US2019/060452, dated Jan. 27, 2020.

* cited by examiner

*Primary Examiner* — Wing F Chan
*Assistant Examiner* — Joseph R Maniwang
(74) *Attorney, Agent, or Firm* — Wenderoth, Lind & Ponack, L.L.P.

(57) ABSTRACT

A Wi-Fi access point device is provided for use with a Wi-Fi communication device that is operable to transmit a login signal and to transmit a reconfiguration signal. The Wi-Fi access point device includes a memory having onboarding configuration information stored therein, an initialization component to generate an initialization signal, an onboarding component to generate an onboarding signal based on the onboarding configuration information; a Wi-Fi communication component to transmit the onboarding signal, based on the initialization signal, by way of a beacon management frame, to receive the login signal and to receive the reconfiguration signal; and a Wi-Fi network creating component to create a Wi-Fi network based on the login signal and to modify the Wi-Fi network.

20 Claims, 9 Drawing Sheets

SYSTEM AND METHOD FOR FIRST TIME AUTOMATIC ON-BOARDING OF WI-FI ACCESS POINT

BACKGROUND

Embodiments of the disclosure relate to devices and methods for onboarding a Wi-Fi access point.

There exists a need for a system and method for automatically onboarding a Wi-Fi access point.

SUMMARY

Aspects of the present disclosure are drawn to a system and method for automatically onboarding a Wi-Fi access point.

An example aspect of the present disclosure is drawn to a Wi-Fi access point device (APD) for use with a Wi-Fi communication device that is operable to transmit a login signal and to transmit a reconfiguration signal. The Wi-Fi APD includes a memory, an initialization component, an onboarding component, a Wi-Fi communication component and a Wi-Fi network creating component. The memory has onboarding configuration information stored therein, wherein the onboarding configuration information includes a factory-set network identifier and a factory-set network password. The initialization component is operable to generate an initialization signal. The onboarding component is operable to generate an onboarding signal based on the onboarding configuration information. The Wi-Fi communication component is operable to transmit the onboarding signal, based on the initialization signal, by way of a beacon management frame, to receive the login signal and to receive the reconfiguration signal. The Wi-Fi network creating component is operable to create a Wi-Fi network based on the login signal and is operable to modify the Wi-Fi network.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

Figure 1:
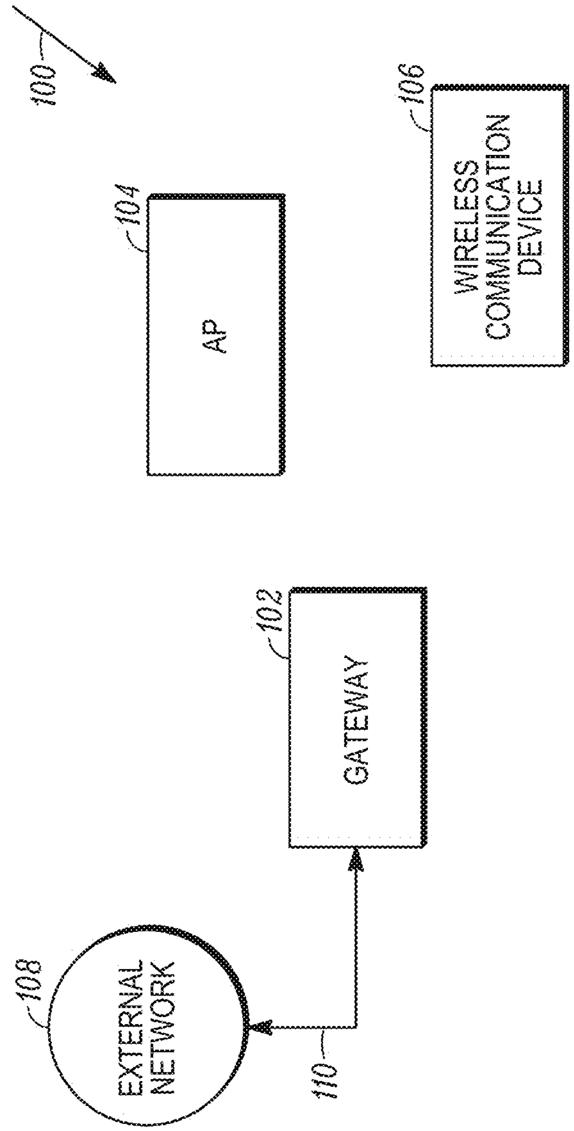
FIG. 1 illustrates a wireless communication system in accordance with aspects of the present disclosure.

An end-user can buy a Wi-Fi APD (i.e., a Wi-Fi router or a Wi-Fi gateway/router) from a retail market. After buying the device, the end-user needs to configure the device or bring it "on-board" before it can be used. Network "onboarding" is the process by which a Wi-Fi APD gains access to the network for the first time.

This disclosure describes systems and methods for automatically onboarding (configuring) a Wi-Fi APD for usage by end-user.

There are two prior art methods for onboarding a Wi-Fi APD.

A first prior art method is a manual method performed by the end-user. In this method, the end-user will login to a user interface screen/page that is associated with the Wi-Fi APD and will configure the settings of the Wi-Fi APD so that it may be used. This manual prior art method is not automatic, is not end-user friendly and is prone to end-user errors.

A second prior art method includes the use of a QR (Quick response) code. In this prior art method, an end-user will use a smartphone-based application to scan a QR code that is on the Wi-Fi APD or is on the packaging of the Wi-Fi APD. The QR code will have necessary information to set the configuration of the Wi-Fi APD. Though this method is automatic, it also has the following flaws.

First, the QR code is printed on the Wi-Fi APD (or on the packaging of the Wi-Fi APD) from the factory. There are high chances that an incorrect QR code is printed on the Wi-Fi APD (or on the packaging of the Wi-Fi APD). If this is the case, the provided QR code cannot be used for configuring Wi-Fi APD. As such, the end-user will ultimately have to use first prior art method of onboarding the Wi-Fi APD.

Second, with time, a QR code label may start fading out or be physically damaged to the point that it is unable to be scanned. In this case also, the end-user cannot reconfigure the Wi-Fi APD using the QR code. Accordingly, end-user will ultimately have to use first prior art method of onboarding the Wi-Fi APD.

In light of the above discussion, it is clear that the first and second prior art methods for onboarding a Wi-Fi APD for usage by end-user have flaws.

The present disclosure provides systems and methods for automatically onboarding a Wi-Fi APD for usage by end-user that overcomes the flaws in the existing methods discussed above.

In accordance with aspects of the present disclosure, a mechanism uses the configuring information from the Wi-Fi device driver or Wi-Fi APD firmware and transmits the configuring information via an IEEE 802.11 management frame (for example; beacon frame) to a Wi-Fi communication device (for example; a smart phone having mobile application) for onboarding of the Wi-Fi APD.

Non-limiting examples of the types of information needed for onboarding the Wi-Fi APD include: a service set identifier (SSID), a passphrase, a security mode, a username for the Wi-Fi APD user interface (UI), a password for the Wi-Fi APD UI and a basic service set identifier (BSSID). This information can be acquired from the Wi-Fi device driver and from the Wi-Fi APD firmware/middleware. This information is derived directly from device driver and firmware/ middleware without any manual intervention and it is always accurate and is not prone to errors.

In an example embodiment, configuration information will be transmitted over IEEE 802.11 management frames (example: the beacon management frame). A beacon frame is periodically sent by the Wi-Fi APD. Configuration information can be inserted in the vendor specific information element of the beacon management frame. For security, configuration information can also be encrypted, to prevent other Wi-Fi clients or related applications from gaining access to the information and incorrectly configuring the Wi-Fi APD.

An aspect of the present disclosure also makes use of Wi-Fi communication device for onboarding of the Wi-Fi APD. Configuration information embedded in the beacon management frame will be parsed by the mobile application within a Wi-Fi communication device, e.g. a smartphone. The Wi-Fi communication device will decrypt (if encrypted) the information, parse the information and configure the Wi-Fi APD.

An aspect of the present disclosure also proposes a method to uniquely identify the Wi-Fi APD and its correct end-user. A unique and individual product identifier key or password may be sent to the Wi-Fi communication device of a registered end-user. This key or password will be used by the Wi-Fi communication device to further decrypt and parse the configuration information present in the beacon management frame. This will prevent unregistered end users from configuring the Wi-Fi APD.

Advantages of systems and methods for automatically onboarding Wi-Fi access point for usage by end-user of the present disclosure include: no manual intervention; the configuration information that is transmitted is always accurate as it is sent by the Wi-Fi APD driver and/or firmware and can be sent as many times as needed; the configuration information is not prone to any human or physical errors; and the configuration information is securely sent over the IEEE 802.11 specifications.

A high-level description of a system and method for automatically onboarding a Wi-Fi APD for usage by end-user of the present disclosure is as follows.

First, an end-user obtains a new Wi-Fi APD and powers-on the Wi-Fi APD for first-time onboarding.

Then a unique and individual product identifier key or password is sent to the end-user's Wi-Fi communication device.

Then the Wi-Fi APD will embed configuration information (SSID, passphrase, security mode, login username, login password and BSSID) in an IEEE 802.11 beacon management frame and periodically broadcast it. In some embodiments, the Wi-Fi APD can also encrypt this information in the beacon management frame. Further, in some embodiments, the Wi-Fi APD can also send unique and individual product identifier key or password in beacon management frame or it can use key or password to encrypt the configuration information in the beacon management frame.

Finally, the end-user's Wi-Fi communication device will use a unique and individual product identifier key or password along with other configuration related information (decrypt and parse the information) to automatically onboard the Wi-Fi APD.

Aspects of the present disclosure will now be described with reference to FIGS. 1-8.

A first example embodiment of a system and method for first-time automatic onboarding of Wi-Fi access point will now be described with reference to FIGS. 1-7.

FIG. 1 illustrates a wireless communication system 100 in accordance with aspects of the present disclosure.

As shown in the figure, wireless communication system 100 includes a gateway 102, a Wi-Fi APD 104, a Wi-Fi communication device 106 and an external network 108.

In this example, gateway 102 and Wi-Fi APD 104 are illustrated as individual devices. However, in some embodiments, gateway 102 and Wi-Fi APD 104 may be combined as a unitary device. Further, in some embodiments, at least one of gateway 102 and Wi-Fi APD 104 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM. EEPROM. CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to, the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet-oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6. MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a “packet” at the network layer), and which includes protocol-control information and possibly user data of that layer, is commonly referred to as a “protocol data unit” or PDU. At the network layer, data is formatted into data packets (e.g., IP datagrams, Ethernet Frames, or other network layer packets).

Gateway 102 may be any device or system that is operable to allow data to flow from a network including gateway 102, Wi-Fi APD 104, a Wi-Fi communication device 106 to external network 108 via communication channel 110. Gateway 102 may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Wi-Fi APD 104 may be any device or system that has onboarding configuration information stored therein, the onboarding configuration information including a factory-set network identifier and a factory-set network password and that is operable to: allow Wi-Fi communication device 106 to connect to gateway 102, so as to connect to external network 108; generate an initialization signal, as will be described in greater detail below; generate an onboarding signal based on the onboarding configuration information, as will be described in greater detail below; transmit the onboarding signal, based on the initialization signal, by way of a beacon management frame, as will be described in greater detail below; receive a login signal, as will be described in greater detail below; receive a reconfiguration signal, as will be described in greater detail below; create a wireless network based on the login signal, as will be described in greater detail below; and modify the onboarding configuration information so as to replace the factory-set network identifier with a new network identifier and so as to replace the factory-set network password with a new network password based on the reconfiguration signal, as will be described in greater detail below.

In some embodiments, Wi-Fi APD 104 may be any device or system that is further operable to: generate the onboarding signal by encrypting the onboarding configuration information, as will be described in greater detail below; modify the onboarding configuration information so as to replace new network identifier with the factory-set network identifier and so as to replace the new network password with the factory-set network password, as will be described in greater detail below; and receive a communication signal from a Wi-Fi communication device and retransmit the communication signal, as will be described in greater detail below.

Wi-Fi communication device 106 may be any device or system that is operable to: wirelessly communicate with at least one of gateway 102 and Wi-Fi APD 104 by way of the Wi-Fi standard: transmit a login signal, as will be described in greater detail below; and transmit a reconfiguration signal, as will be described in greater detail below. Non-limiting examples of Wi-Fi communication device 106 include a smartphone, a tablet, and a laptop.

Wi-Fi communication device 106 is able to wirelessly communicate with Wi-Fi APD 104, as will be described in more detail below. Wi-Fi APD 104 is able to additionally communicate with gateway 102. Gateway 102 is able to communicate with external network 108 by way of a communication channel 110, which may be any known type of communication channel, non-limiting examples of which include a wired and wireless communication channel.

An example method 200 for performing a first-time automatic onboarding of a Wi-Fi access point in accordance with aspects of the present disclosure will now be described with additional reference to FIGS. 2-7.

Figure 2:
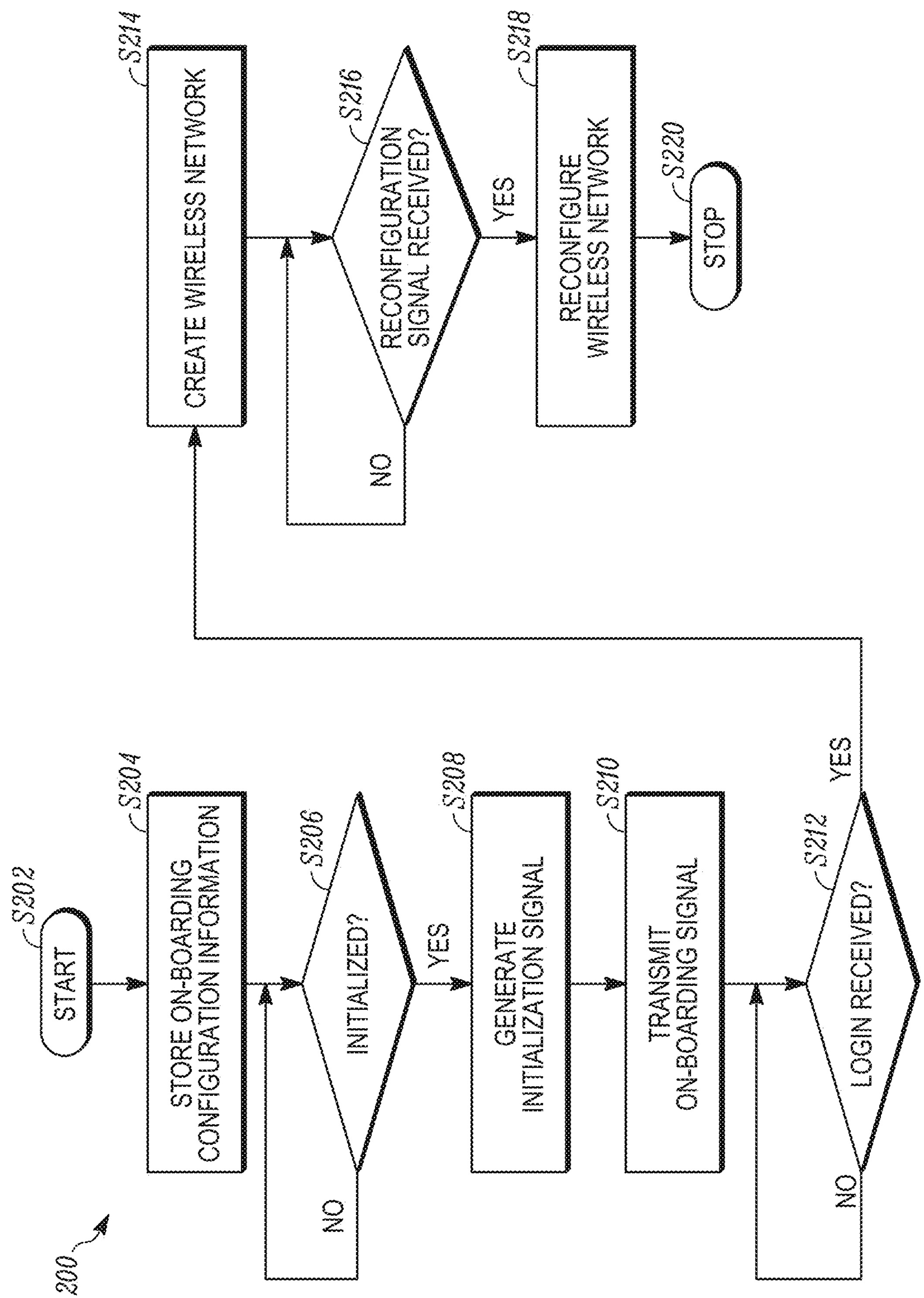
FIG. 2 illustrates an example method for performing a first-time automatic onboarding of a Wi-Fi access point device (APD) in accordance with aspects of the present disclosure.

FIG. 2 illustrates method 200.

As shown in the figure, method 200 starts (S202) and onboarding configuration information is stored (S204). In an example embodiment, onboarding configuration information is stored into a memory, wherein the onboarding configuration information includes a factory-set network identifier and a factory-set network password. This will be described in greater detail with reference to FIG. 3

Figure 3:
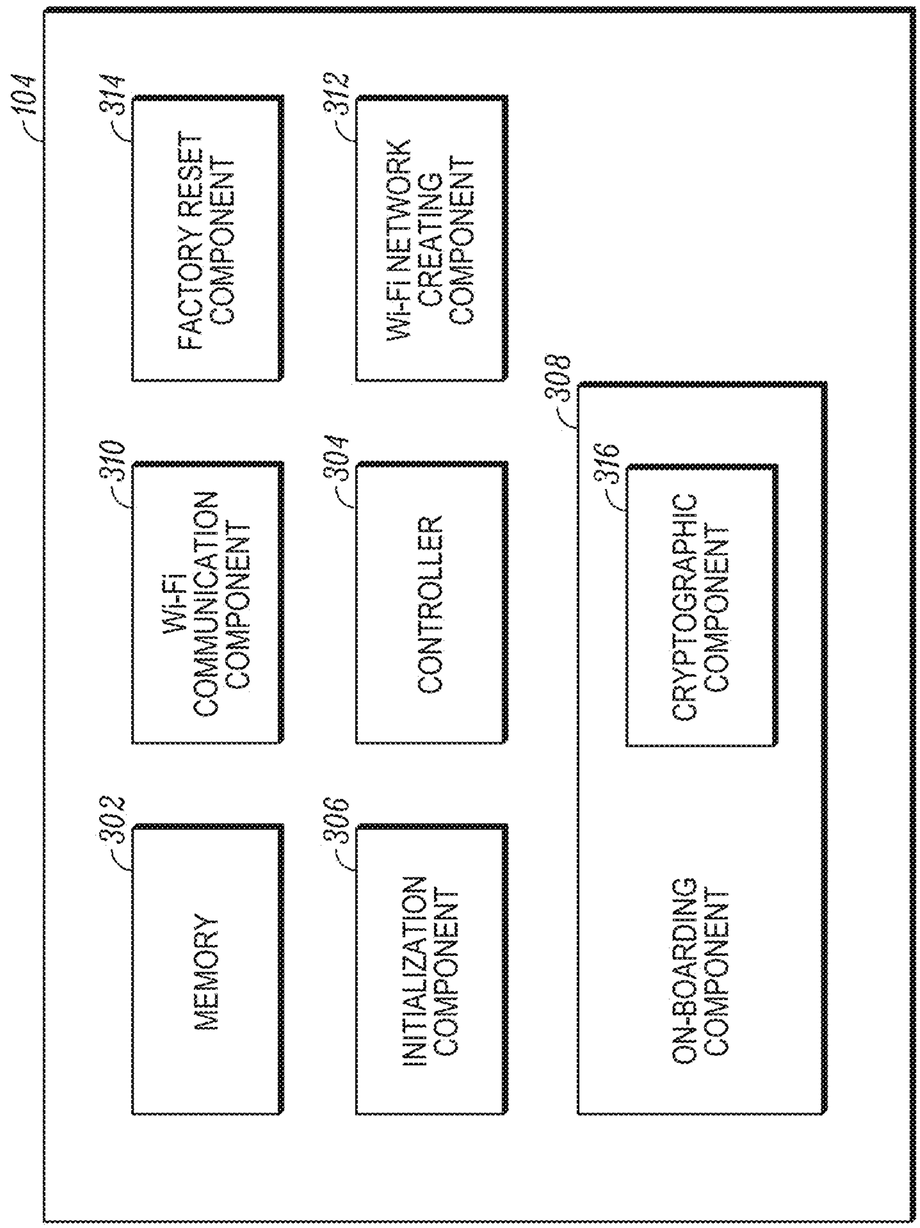
FIG. 3 illustrates an exploded view of the Wi-Fi APD of FIG. 1.

FIG. 3 illustrates an exploded view of Wi-Fi APD 104 of FIG. 1.

As shown in FIG. 3. Wi-Fi APD 104 includes a memory 302, a controller 304, an initialization component 306, an onboarding component 308, a Wi-Fi communication component 310, a Wi-Fi network creating component 312 and a factory reset component 314. Further, onboarding component 308 includes a cryptographic component 316.

In this example, memory 302, controller 304, initialization component 306, onboarding component 308, Wi-Fi communication component 310, Wi-Fi network creating component 312 and factory reset component 314 are illustrated as individual devices. However, in some embodiments, at least two of memory 302, controller 304, initialization component 306, onboarding component 308. Wi-Fi communication component 310, Wi-Fi network creating component 312 and factory reset component 314 may be combined as a unitary device. Further, in some embodiments, at least one of memory 302, controller 304, initialization component 306, onboarding component 308, Wi-Fi communication component 310, Wi-Fi network creating component 312 and factory reset component 314 may be implemented as a computer having tangible computer-readable media for carrying or having computer-executable instructions or data structures stored thereon.

When Wi-Fi APD 104 is prepared for shipment from the manufacturer, the onboarding configuration information is stored in memory 302.

Memory 302 may be any device or system that is able to have onboarding configuration information stored therein, wherein the onboarding configuration information includes a factory-set network identifier and a factory-set network password. Non-limiting examples of memory 302 include any known physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Wi-Fi device driver or Wi-Fi APD firmware may be stored as a program/utility, having a set (at least one) of program modules, may be stored in memory 302 as well as an operating system, one or more application programs, other program modules, and program data. The program modules within memory 302 may be access by controller 304 to carry out the Wi-Fi automatic onboarding functions of various embodiments of the application as described herein.

The Wi-Fi device driver or Wi-Fi APD firmware includes the onboarding configuration information, which is information that is needed by a Wi-Fi communication device to establish a Wi-Fi connection with Wi-Fi APD 104. The onboarding configuration information includes a network identifier, a network password, an SSID, passphrase, security mode, login username, login password and BSSID. When prepared for shipment, the manufacturer establishes initial settings for this information as factory-set settings, some of which may be changed by an authorized user at a later time. In particular, an initial network identifier is provided as a factory-set network identifier and an initial network password is provided as a factory-set network password.

After the onboarding configuration information is stored, Wi-Fi APD 104 may be shipped for purchase. Eventually, Wi-Fi APD 104 is purchased by an end user, is unpackaged and is prepared for use in a Wi-Fi network.

Returning to FIG. 2, after the onboarding configuration information is stored (S204), it is determined whether Wi-Fi APD 104 is initialized (S206). In an example embodiment, initialization component 306 is operable to determine whether Wi-Fi APD 104 is initialized. This will be described in greater detail with reference to FIG. 3.

As shown in FIG. 3, controller 304 instructs the operation of initialization component 306.

Controller 304 may be any device or system that is operable to control the operation of each of memory 302, initialization component 306, onboarding component 308. Wi-Fi communication component 310. Wi-Fi network creating component 312 and factory reset component 314.

Initialization component 306 may be any device or system that is operable to generate an initialization signal, as will be discussed in more detail below.

In an example embodiment, Wi-Fi APD 104 may initialize upon receiving power. e.g., starting up Wi-Fi APD 104 for the first time. In such embodiments, controller 304 and initialization component 306 may be triggered by any of a voltage, a current or a combination thereof. The triggering of initialization component 306 by the voltage, current or combination thereof is one example of an initialization of Wi-Fi APD 104. In another embodiment, the powering up of Wi-Fi APD 104 may trigger an automatic boot up of Wi-Fi APD 104, wherein completion of the boot up triggers initialization component 306. In other embodiments, Wi-Fi APD 104 may have a dedicated initialization actuator, for example a button that may be pressed. In these embodiments, the dedicated initialization actuator may trigger initialization component 306, which would be another example of an initialization of Wi-Fi APD 104.

Returning to FIG. 2, if it is determined that Wi-Fi APD 104 is not initialized (N at S206), then Wi-Fi APD 104 waits until it is initialized (return to S206). However, it is determined that Wi-Fi APD 104 is initialized (Y at S206), then an initialization signal is generated (S208). In an example embodiment, initialization component 306 generates an initialization signal.

For example, returning to FIG. 3, once triggered, initialization component 306 may generate an initialization signal, which is then provided to controller 304.

Returning to FIG. 2, after the initialization signal is generated (S208), an onboarding signal is transmitted (S210). In an example embodiment, Wi-Fi communication component 310 transmits an onboarding signal, based on the initialization signal, by way of a beacon management frame. This will be described in greater detail with reference to FIGS. 3 and 4.

Returning to FIG. 3, controller 304 instructs onboarding component 308 to generate an onboarding signal based on the initialization signal from initialization component 306.

Onboarding component 308 may be any device or system that is operable to generate an onboarding signal based on the onboarding configuration information. Onboarding component 308 accesses the on-boarding configuration information from memory 302. Once received, on-boarding component 308 generates the onboarding signal in accordance with the Wi-Fi standard.

A beacon frame is one of the management frames in IEEE 802.11 based WLANs. It contains all the information about the network. Beacon frames are transmitted periodically, they serve to announce the presence of a wireless LAN and to synchronize the members of the service set. Beacon frames are transmitted by Wi-Fi APD 104 in an infrastructure basic service set (BSS). In accordance with the Wi-Fi standard. Wi-Fi APD 104 may send beacon frames at a defined interval, which is often set to a default 100 TU which is equivalent to 102.4 ms.

In accordance with the present disclosure the beacon frame generated by onboarding component 308 includes the onboarding configuration information.

In some embodiments, the onboarding signal may be additionally encrypted by cryptographic component 316. Cryptographic component 316 may be any device or system that is operable to generate the onboarding signal by encrypting the onboarding configuration information. Cryptographic component 316 may encrypt the onboarding signal by any known encryption method, non-limiting examples of which include a public key infrastructure (PKI), symmetrical encryption, a Secure Sockets Layer (SSL) and a Transport Layer Security (TLS).

Whether encrypted or non-encrypted, onboarding component 308 then provides the onboarding signal to Wi-Fi communication component 310. Wi-Fi communication component then encodes the onboarding signal for broadcast.

Wi-Fi communication component 310 may be any device or system that is operable to wirelessly transmit and receive data. In an example embodiment, Wi-Fi communication component 310 is operable to: encode the onboarding signal, transmit the encoded onboarding signal, based on the initialization signal, by way of an IEEE 802.11 beacon management frame; receive and decode an encoded login signal, as will be described in greater detail below; and receive and decode an encoded reconfiguration signal, as will be described in greater detail below. Still further, in some embodiments, Wi-Fi communication component 310 is further operable to receive an encoded communication signal from a Wi-Fi communication device and to retransmit the encoded communication signal, as will be described in greater detail below.

Once Wi-Fi APD 104 has initialized, and onboarding component 308 has generated the onboarding signal, either encrypted or non-encrypted, Wi-Fi communication component 310 transmits the encoded onboarding signal. In an example embodiment, Wi-Fi communication component 310 transmits the encoded onboarding signal by way of a broadcast in accordance with the Wi-Fi standard, wherein the on-barding configuration information is provided in the IEEE 802.11 beacon management frame. This is illustrated in FIG. 4.

Figure 4:
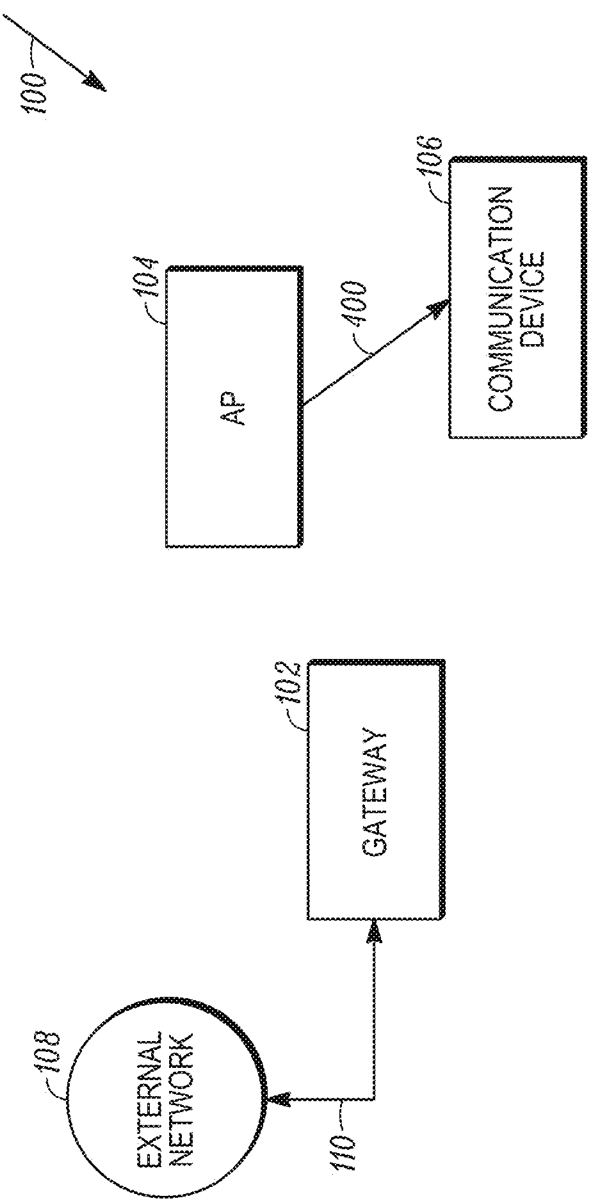
FIG. 4 illustrates the wireless communication system of FIG. 1 at an onboarding time $t_{ob}$, wherein an onboarding signal is broadcast from the Wi-Fi APD.

FIG. 4 illustrates wireless communication system 100 at an onboarding time $t_{ob}$, wherein an onboarding signal 400 is broadcast from Wi-Fi APD 104. In an example embodiment, Wi-Fi APD 104 continues to broadcast onboarding signal 400 until a login signal is received.

Returning to FIG. 2, after the onboarding signal is transmitted (S210), it is determined whether a login signal is received (S212). In an example embodiment, Wi-Fi communication component 310 is operable to receive an encoded login signal. This will be described in greater detail with reference to FIGS. 3 and 5.

Returning to FIG. 3, Wi-Fi communication component 310 is able to transmit and receive Wi-Fi signals. While periodically transmitting the onboarding signal, Wi-Fi communication component 310 may receive a login signal from a Wi-Fi communication device.

For purposes of discussion, as shown in FIG. 4, consider the situation where Wi-Fi communication device 106 receives the onboarding signal that is broadcast from Wi-Fi APD 104. More particularly, continuing with the example embodiment discussed above, let the owner of Wi-Fi communication device 106 be the person who purchased Wi-Fi APD 104 and powered up Wi-Fi APD for the purpose of creating a Wi-Fi network. In such a case, the owner of Wi-Fi communication device 106 would be waiting for onboarding signal 400 so that Wi-Fi communication device 106 may easily on-board onto Wi-Fi APD 104.

When Wi-Fi communication device 106 receives onboarding signal 400, if encrypted, onboarding signal 400 is decrypted using the known decryption method. For example, if onboarding signal 400 is encrypted using a PKI then the public key that is transmitted in the onboarding signal 400 is used to decrypt the signal.

After Wi-Fi communication device 106 receives onboarding signal 400, or after Wi-Fi communication device 106 decrypts the encrypted onboarding signal 400, onboarding signal 400 is decoded and the onboarding configuration information is removed from the IEEE 802.11 beacon management frame. Wi-Fi communication device 106 then parses required information from the onboarding configuration information to generate a login signal so as to login to Wi-Fi APD 104. The required information includes the factory-set network identifier and the factory-set network password.

Wi-Fi communication device 106 then generates a login signal that includes the factory-set network identifier and the factory-set network password as parsed from the received IEEE 802.11 beacon management frame. Further, the login signal may include any other required information that is provided in the onboarding configuration information.

Figure 5:
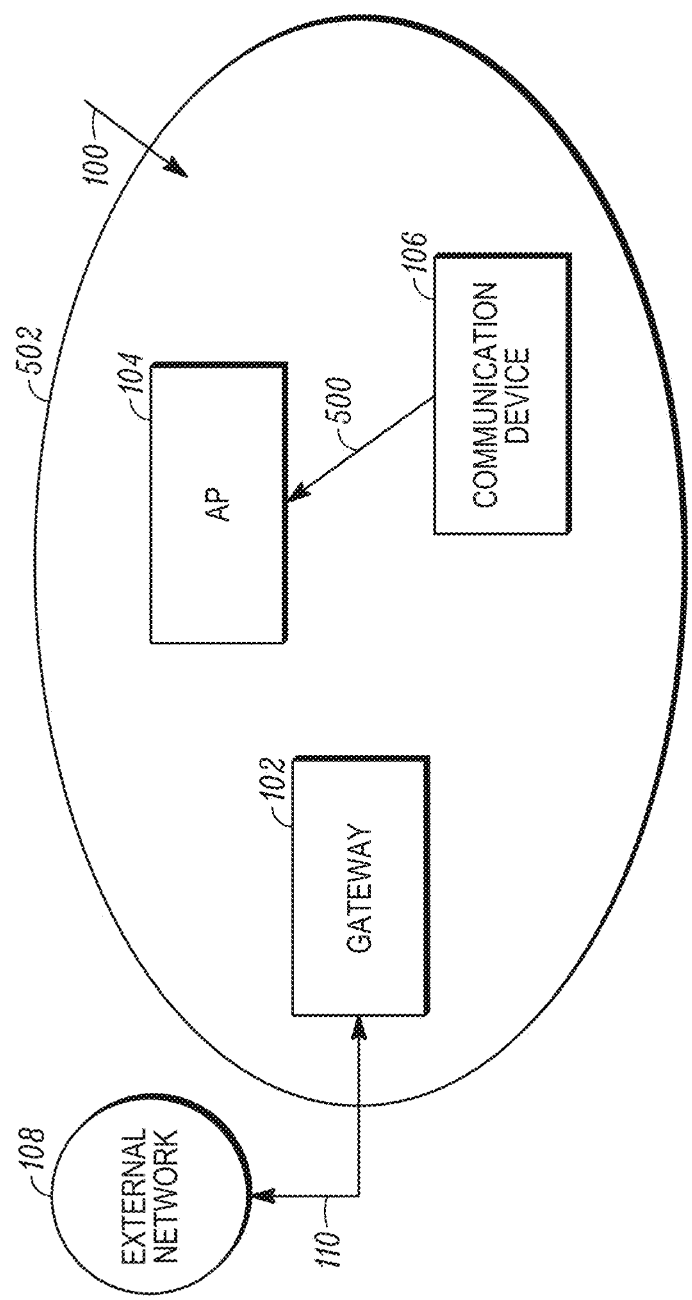
FIG. 5 illustrates the wireless communication system of FIG. 1 at a login time $t_l$, wherein a login signal is transmitted from the Wi-Fi communication device.

FIG. 5 illustrates wireless communication system 100 at a login time $t_L$, wherein a login signal 500 is transmitted from Wi-Fi communication device 106.

For purposes of discussion, as shown in FIG. 5, continuing with the example embodiment discussed above, let the owner of Wi-Fi communication device 106 be the person who purchased Wi-Fi APD 104 and powered up Wi-Fi APD for the purpose of creating a Wi-Fi network. In such a case, the owner of Wi-Fi communication device 106 has now received onboarding signal 400 and has instructed Wi-Fi communication device 106, via any known user interface (not shown), to on-board onto Wi-Fi APD 104 by sending login signal 500 from Wi-Fi communication device 106 to Wi-Fi APD 104. This will be described in greater detail with reference to FIG. 6.

Figure 6:
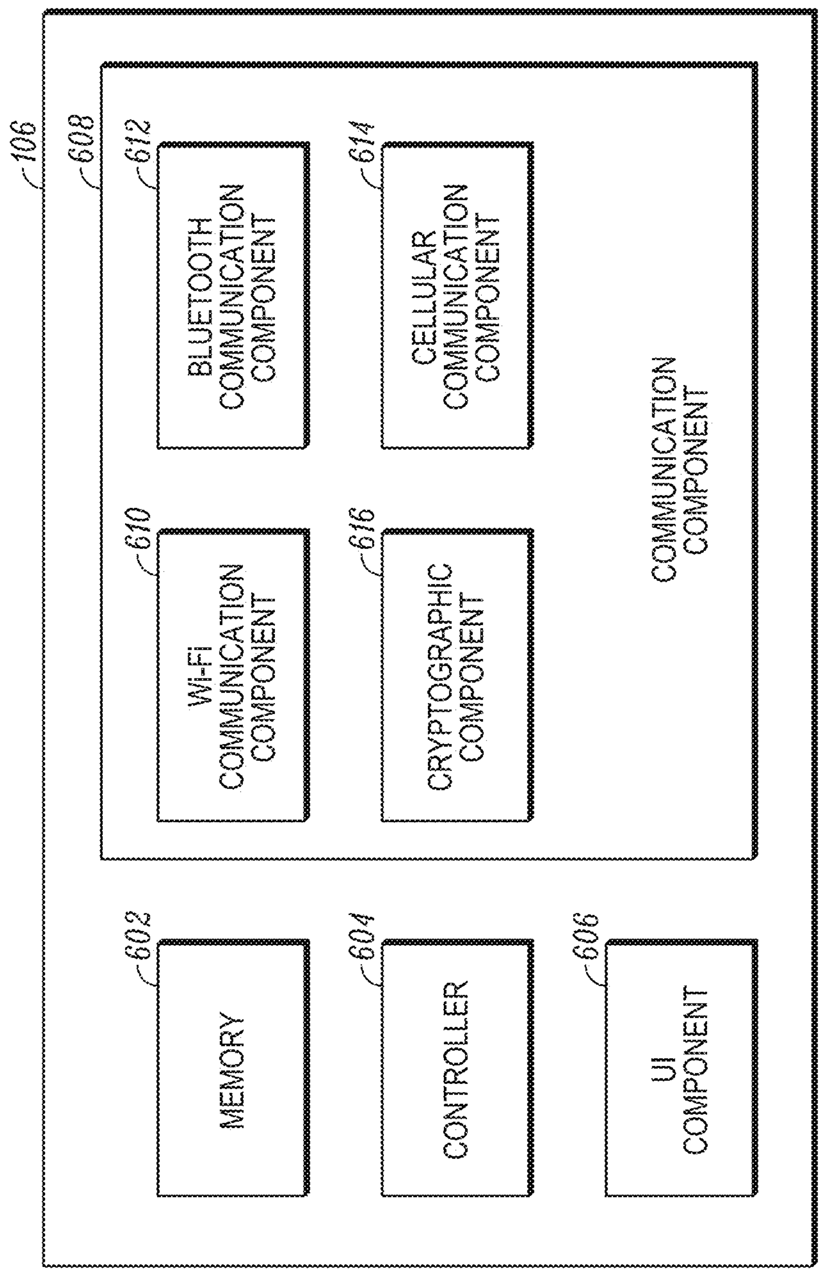
FIG. 6 illustrates an exploded view of the Wi-Fi communication device of FIG. 1.

FIG. 6 illustrates an exploded view of Wi-Fi communication device 106.

As shown in FIG. 6. Wi-Fi communication device 106 includes a memory 602, a controller 604, a user interface (UI) component 606 and a communication component 608.

In this example, memory 602, controller 604, UI component 606 and communication component 608 are illustrated as individual devices. However, in some embodiments, at least two of memory 602, controller 604, UI component 606 and communication component 608 may be combined as a unitary device. Further, in some embodiments, at least one of memory 602, controller 604, UI component 606 and communication component 608 may be implemented as a computer having tangible computer-readable media for carrying or having computer-executable instructions or data structures stored thereon.

Communication component 608 includes a Wi-Fi communication component 610, a Bluetooth communication component 612, a cellular communication component 614 and a cryptographic component 616.

In this example, Wi-Fi communication component 610, Bluetooth communication component 612, cellular communication component 614 and cryptographic component 616 are illustrated as individual devices. However, in some embodiments, at least two of Wi-Fi communication component 610, Bluetooth communication component 612, cellular communication component 614 and cryptographic component 616 may be combined as a unitary device. Further, in some embodiments, at least one of Wi-Fi communication component 610, Bluetooth communication component 612, cellular communication component 614 and cryptographic component 616 may be implemented as a computer having tangible computer-readable media for carrying or having computer-executable instructions or data structures stored thereon.

Memory 602 may be any device or system that is operable to store data therein. Non-limiting examples of memory 602 include any known physical storage and/or memory media such as RAM, ROM. EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Controller 604 may be any device or system that is operable to control the operation of each of memory 602, UI component 606 and communication component 608. Communication firmware may be stored as a program/utility, having a set (at least one) of program modules, and may be stored in memory 602 as well as an operating system, one or more application programs, other program modules, and program data. The program modules within memory 602 may be accessed by controller 604 to carry out the functions of communication functions of UI component 606 and communication component 608.

UI component 606 may be any device or system that is operable to enable a user to access and control controller 604. UI component 606 may include one or more layers including a human-machine interface (HMI) machines with physical input hardware such as keyboards, mice, game pads and output hardware such as computer monitors, speakers, and printers. Additional UI layers in UI component 606 may interact with one or more human senses, including: tactile UI (touch), visual UI (sight), and auditory UI (sound).

Communication component 608 may be any device or system that is operable to communicate externally with another device or network. Wi-Fi communication component 610 may be any device or system that is operable to wirelessly communicate using the Wi-Fi standard with another device or network. Bluetooth communication component 612 may be any device or system that is operable to wirelessly communicate using the Bluetooth standard with another device or network. Cellular communication component 614 may be any device or system that is operable to wirelessly communicate using a cellular network with anther device or network.

Cryptographic component 616 may be any device or system that is operable to encrypt signals to be transmitted from communication component 608 and to decrypt signals received by communication component 608.

In accordance with aspects of the present disclosure, Wi-Fi communication component 610 is operable to receive signal onboarding signal 400 from Wi-Fi APD 104 and decode the received signal.

In cases where onboarding signal 400 is encrypted, Wi-Fi communication component 610 provides encrypted onboarding signal 400 to cryptographic component 616 for decrypting. In cases where onboarding signal 400 is encrypted using PKI, then Wi-Fi communication component 610 and cryptographic component 616 communicate in tandem with Wi-Fi APD with known handshakes to decrypt encrypted onboarding signal 400 using the appropriate private and public keys.

The unencrypted (or decrypted as the case may be) onboarding signal is then decoded by Wi-Fi communication component 610 and is provided to controller 604. In response to receiving the decoded onboarding signal, controller 604 instructs UI component 606 to notify the owner, for example by display, that a new wireless access point has been detected and is ready for onboarding with Wi-Fi communication device 106.

The owner may then instruct controller 604, by way of UI component 606, to login to Wi-Fi APD 104. Controller 604 then parses the onboarding configuration information from onboarding signal 400, as decoded by Wi-Fi communication component. Controller 604 then stores the onboarding configuration information in memory 602 and stores an association of Wi-Fi APD 104 with the onboarding configuration information in memory 602. In this way, when Wi-Fi communication device 106 encounters Wi-Fi APD 104 in the future. Wi-Fi communication device 106 will have the credentials needed to reconnect with Wi-Fi APD 104.

Further, controller 604 instructs Wi-Fi communication component 610 to generate a login signal based on the onboarding configuration information. In an example embodiment, Wi-Fi communication component 610 generates the login signal so as to include the factory-set network identifier and the factory-set network password that is provided in the onboarding configuration information as received in onboarding signal 400.

In cases where the received onboarding signal was encrypted, Wi-Fi communication component 610 will instruct cryptographic component 616 to encrypt the login signal in a similar encryption method. Wi-Fi communication component then generates login signal 500 using the Wi-Fi encoding standard and transmits login signal 500 to Wi-Fi APD 104.

If Wi-Fi communication device 106 transmits login signal 500 to Wi-Fi APD 104, then login signal 500 is received by Wi-Fi communication component 310. Wi-Fi APD 104 will then decode login signal 500, parses the decoded signal and obtain the factory-set network identifier and the factory-set network password included in login signal 500. Wi-Fi communication device 106 then provides the received factory-set network identifier and the factory-set network password to controller 304.

Controller 304 then compares the received factory-set network identifier and the factory-set network password from login signal 500 with the factory-set network identifier and the factory-set network password in the onboarding configuration information from memory 302.

If controller 304 determines that the received factory-set network identifier and the factory-set network password from login signal 500 matches the factory-set network identifier and the factory-set network password in the onboarding configuration information from memory 302, then controller 304 determines that a login signal has been received.

If Wi-Fi communication device 106 does not provide any received factory-set network identifier and factory-set network password to controller 304, or if controller 304 determines that the received factory-set network identifier and the factory-set network password from login signal 500 does not match the factory-set network identifier and the factory-set network password in the onboarding configuration information from memory 302, then controller 304 determines that a login signal has not been received.

Returning to FIG. 2, if it is determined that a login signal is not received (No at S212), then then Wi-Fi APD 104 waits until a login signal is received (return to S212). However, it is determined that login signal is received (Y at S212), then a wireless network is created (S214). In an example embodiment, Wi-Fi network creating component 312 creates a wireless network based on the login signal. This will be described in greater detail with reference to FIG. 3.

Returning to FIG. 3, Wi-Fi network creating component 312 may be any device or system that is operable to: create a wireless network based on the login signal, as will be described in greater detail below: modify the Wi-Fi network, as will be described in greater detail below; and modify the Wi-Fi network by modifying the onboarding configuration information so as to replace the factory-set network identifier with a new network identifier and so as to replace the factory-set network password with a new network password based on the reconfiguration signal, as will be described in greater detail below.

When controller 304 determines that a login signal is received, controller 304 instructs Wi-Fi network creating component 312 to create a Wi-Fi network 502 enabling Wi-Fi communication device 106 to communicate with external network 108, by way of communication channel 110, gateway 103 and Wi-Fi APD 104 via the Wi-Fi standard. Wi-Fi network creating component 312 creates Wi-Fi network 502 in accordance with the onboarding information.

At this point in time Wi-Fi network 502 is established. Suppose, for the sake of discussion that Wi-Fi communication device 106 were to physically separate from Wi-Fi APD 104 sufficiently enough to drop from Wi-Fi network 502. In such a case, as Wi-Fi network 502 is established, if Wi-Fi communication device 106 were return to Wi-Fi APD 104 so as to detect Wi-Fi network 502, then Wi-Fi communication device 106 may again join Wi-Fi network 502 using the factory-set network identifier and the factory-set network password.

However, continuing with the example embodiment discussed above, let the owner of Wi-Fi communication device 106 be the person who purchased Wi-Fi APD 104, and powered up Wi-Fi APD, created Wi-Fi network 502 and on-boarded Wi-Fi communication device 106. In such a case, the owner of Wi-Fi communication device 106 might want to prevent others from gaining access to, or worse, gaining control of Wi-Fi APD 104. Accordingly, the owner may want to reconfigure Wi-Fi network 502 by changing parameters of Wi-Fi network 502 by way of Wi-Fi communication device 106.

In accordance with aspects of the present disclosure, the owner may change parameters of Wi-Fi network 502 by way of Wi-Fi communication device 106, wherein non-limiting examples of such parameters include the factory-set network identifier, the factory-set network password, the security mode, and any other parameters associated with Wi-Fi network 502. Therefore, in accordance with aspects of the present discloser, the owner may modify Wi-Fi network 502 by way of transmitting a reconfiguration signal from Wi-Fi communication device 106.

Returning to FIG. 6, Wi-Fi communication component may transmit a reconfiguration signal. In an example embodiment, controller 604 instructs UI component 606 to provide a prompt to the owner to change parameters of Wi-Fi network 502. For example, UI component may display a message "Would you like to change the network identifier and the network password of the Wi-Fi network?" In accordance with known interactive display methods for changing network identifiers and network passwords, controller 604 may react to inputs provided by the owner by way of UI component 606 so as to create necessary instructions to replace the current factory-set network identifier of Wi-Fi network 502 with a new network identifier provided by the owner and to replace the current factory-set network password of Wi-Fi network 502 with a new network password provided by the owner. These instructions will be used by Wi-Fi communication component 610 to create and transmit a reconfiguration signal to Wi-Fi APD 104.

Returning to FIG. 2, after the wireless network is created (S214), it is determined whether a reconfiguration signal is received (S216). If it is determined that a reconfiguration signal is not received (No at S216), then then Wi-Fi APD 104 waits until a reconfiguration signal is received (return to S216).

Returning to FIG. 5, while waiting for a reconfiguration signal, Wi-Fi APD 104 operates as a conventional Wi-Fi APD and Wi-Fi network 502 operates as a conventional Wi-Fi network in accordance with the Wi-Fi standard. However, the network identifier of Wi-Fi network 502 is currently the factory-set network identifier and the network password of Wi-Fi network 502 is currently the factory-set network password. Therefore, there is an increased likelihood that a person with knowledge of these factory settings may gain unauthorized access to Wi-Fi network 502, and more importantly, gain unauthorized access to Wi-Fi APD 104 to reconfigure Wi-Fi network 502 without authorization.

To prevent such unauthorized access, the owner may want to transmit a reconfiguration signal to Wi-Fi APD 104 from Wi-Fi communication device 106 at his earliest convenience.

Returning to FIG. 2, if it is determined that reconfiguration signal is received (Y at S216), then the wireless network is reconfigured (S218). In an example embodiment, Wi-Fi communication component 310 is operable to receive a reconfiguration signal. Further, in an example embodiment. Wi-Fi network creating component 312 modifies the onboarding configuration information so as to replace the factory-set network identifier with a new network identifier and so as to replace the factory-set network password with a new network password based on the reconfiguration signal. This will be described in greater detail with reference to FIGS. 3 and 7.

Figure 7:
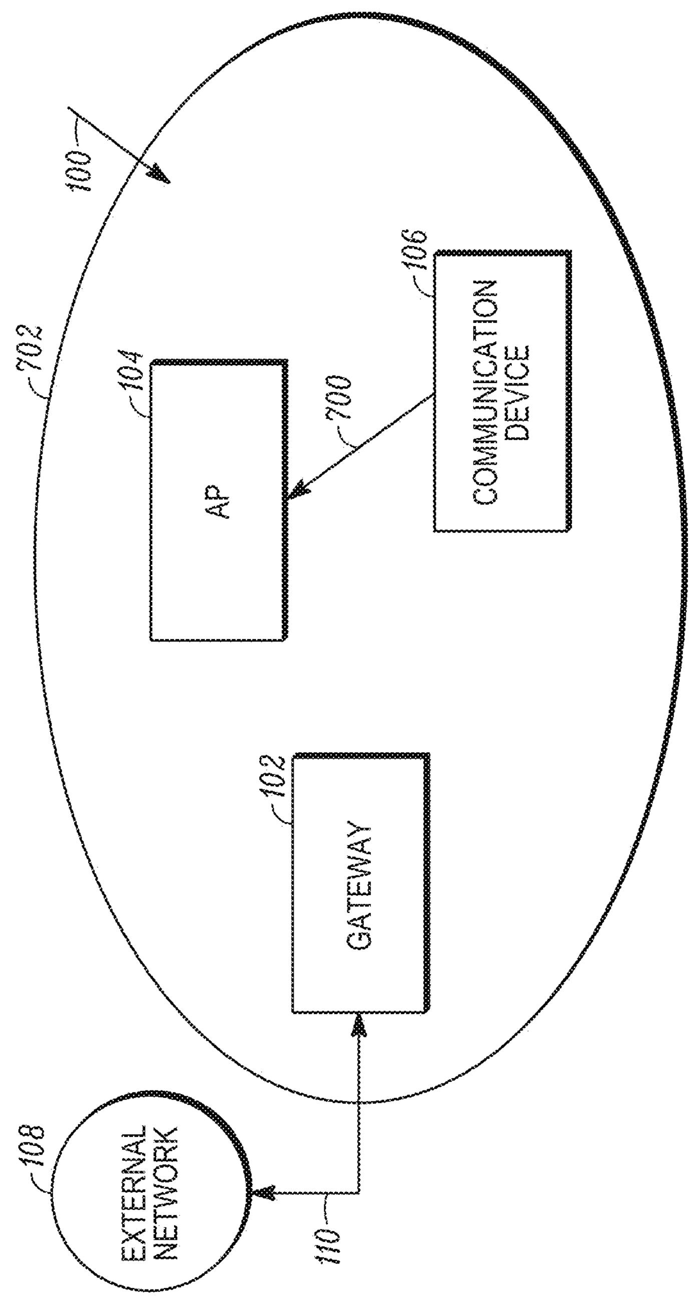
FIG. 7 illustrates the wireless communication system of FIG. 1 at a reconfiguration time $t_r$, wherein a reconfiguration signal is transmitted from Wi-Fi communication device.

FIG. 7 illustrates wireless communication system 100 at a reconfiguration time $t_r$, wherein a reconfiguration signal 700 is transmitted from Wi-Fi communication device 106.

Returning to FIG. 3. Wi-Fi communication component 310 receives reconfiguration signal 700 from Wi-Fi communication device 106. Wi-Fi communication component 310 will then decode reconfiguration signal 700, parse the decoded signal and obtain instructions to replace the factory-set network identifier with a new network identifier and to replace the factory-set network password with the new network password. Wi-Fi communication component 310 then provides the instructions to controller 304.

Controller 304 then stores the new network identifier and the new network password in memory 302. Controller 304 additionally instructs Wi-Fi network creating component 312 to reconfigure the created Wi-Fi network so as to use the new network identifier stored in memory 302 and to use the new network password stored in memory 302. Wi-Fi network creating component 312 then reconfigures Wi-Fi network 502 so as to use the new network identifier stored in memory 302 and to use the new network password stored in memory 302, thus creating new Wi-Fi network 702 as shown in FIG. 7.

Returning to FIG. 2, after the wireless network is reconfigured (S218), method 200 stops (S220).

At this point. Wi-Fi network 702 operates as a conventional Wi-Fi network wherein Wi-Fi communication device 106 has access and control of Wi-Fi APD 104.

There may be a situation where the owner of Wi-Fi APD 104 desires to create a new Wi-Fi network. e.g. connect to a new gateway, or transfer ownership of Wi-Fi APD 104. In such a case, a new "first" automatic onboarding method may be required. In such a case, the owner may wish to restore the factory settings of the onboarding configuration information, such as the factory-set network identifier and the factory-set network password.

In accordance with another aspect of the present disclosure, the owner may reset the onboarding configuration information of Wi-Fi APD 104 using Wi-Fi communication device 106. For example, returning to FIG. 3, factory reset component 314 may be any device or system that is operable to modify the onboarding configuration information so as to replace new network identifier with the factory-set network identifier and so as to replace the new network password with the factory-set network password.

In one embodiment, the factory-set network identifier and the factory-set network password are stored in memory 302 and are used to replace the new network identifier the new network password respectively.

For example, returning to FIG. 6 Wi-Fi communication component may transmit another reconfiguration signal. In an example embodiment, the owner may access controller 604 by way of UI component 606 to reset parameters of Wi-Fi network 502 back to the factory default settings, which include changing the current network password back to the factory-set network password and changing the current network identifier back to the factory-set network identifier. In accordance with known interactive display methods for changing network identifiers and network passwords, controller 604 may react to inputs provided by the owner by way of UI component 606 so as to create necessary instructions to replace the current network identifier of Wi-Fi network 702 with the factory-set network identifier and to replace the current network password of Wi-Fi network 702 with the factory-set network password. These instructions will be used by Wi-Fi communication component 610 to create and transmit another reconfiguration signal to Wi-Fi APD 104.

In some embodiments, controller 604 may generate the instructions so as to include with the factory-set network identifier and the factory-set network password as stored in memory 602. As such, the new reconfiguration signal generated by Wi-Fi communication component 610 will include the factory-set network identifier and the factory-set network password to be used by Wi-Fi APD 104. In other embodiments, controller 604 may generate the instructions so as to instruct Wi-Fi APD 104 to retrieve the factory-set network identifier and the factory-set network password from memory 302 in Wi-Fi APD 104.

With either embodiment, as shown in FIG. 3, when Wi-Fi APD 104 receives the new reconfiguration signal from Wi-Fi communication device 106. Wi-Fi network creating component 312 is able to modify the Wi-Fi network by modifying the onboarding configuration information so as to replace the new network identifier with the factory-set network identifier and so as to replace the new network password with the factory-set network password based on the reconfiguration signal.

At this point, the owner of Wi-Fi APD 104 may connect Wi-Fi APD 104 to a new gateway, or transfer ownership of Wi-Fi APD 104, so that a new "first" automatic onboarding method may be performed.

As noted above, Wi-Fi APD 104 and Wi-Fi communication device 106 may communicate with one another using known encryption methods. A working example discussed above includes using PKI.

In another working example, the owner of a purchased Wi-Fi APD may use a key or password provided with the Wi-Fi APD or on the packaging of the Wi-Fi APD to initiate automatic onboarding.

Another example embodiment of a system and method for first-time automatic onboarding of Wi-Fi access point will now be described with reference to FIG. 8.

Figure 8:
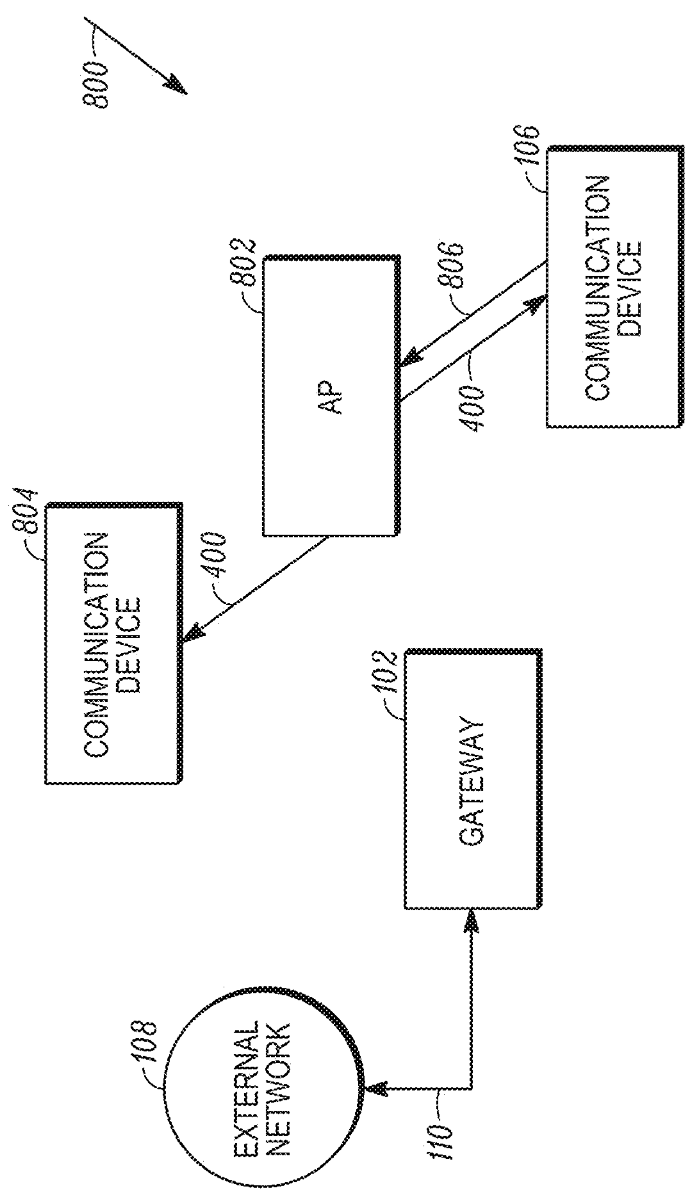
FIG. 8 illustrates another example wireless communication system in accordance with aspects of the present disclosure.

As shown in FIG. 8, wireless communication system 800 differs from wireless communication system 100 of FIG. 1 in that Wi-Fi APD 104 is replaced with a Wi-Fi APD 802 and a communication device 804 is present. In this example embodiment, Wi-Fi APD 802 is a modified version of Wi-Fi APD 104 that is able to more securely communicate with Wi-Fi communication device 106 during the onboarding process.

In this example embodiment, either that packaging of Wi-Fi APD 802 or Wi-Fi APD 802 itself includes an onboarding password. In particular, returning to FIG. 2, after Wi-Fi APD 802 is initialized (S206), and after an initialization signal is generated (S208). Wi-Fi APD 802 transmits onboarding signal 400 (S210). In this example, communication device 804 will additionally receive onboarding signal 400. However, the owner of communication device 804 does have the onboarding password that was provided with Wi-Fi APD 802. Therefore, communication device 804 is unable to on-board onto Wi-Fi APD 802.

However, upon receiving on-barding signal 400 at Wi-Fi communication device 106, the owner will use the provided onboarding password when transmitting a login signal 806 from Wi-Fi communication device 106 (S212 of method 200).

In this example embodiment. Wi-Fi APD 802 and Wi-Fi communication device 106 do not exchange private and public keys in accordance with PKI. On the contrary, in this example embodiment, Wi-Fi APD 802 and Wi-Fi communication device 106 establish a secure communication channel via the onboarding password included in the packaging of Wi-Fi APD 802 or Wi-Fi APD 802 itself, with which only the owner of Wi-Fi APD 802 and Wi-Fi communication device 106 has access.

In the above discussed example embodiments of FIGS. 1-8, Wi-Fi communication device 106 gains access to external network 108 by way of a Wi-Fi APD that is distinct from gateway 102. It should be noted that in other example embodiments of the present disclosure, a gateway may include a Wi-Fi APD or may have Wi-Fi access point functionality. This will be described with reference to FIG. 9.

Another example embodiment of a system and method for first-time automatic onboarding of Wi-Fi access point will now be described with reference to FIG. 9.

Figure 9:
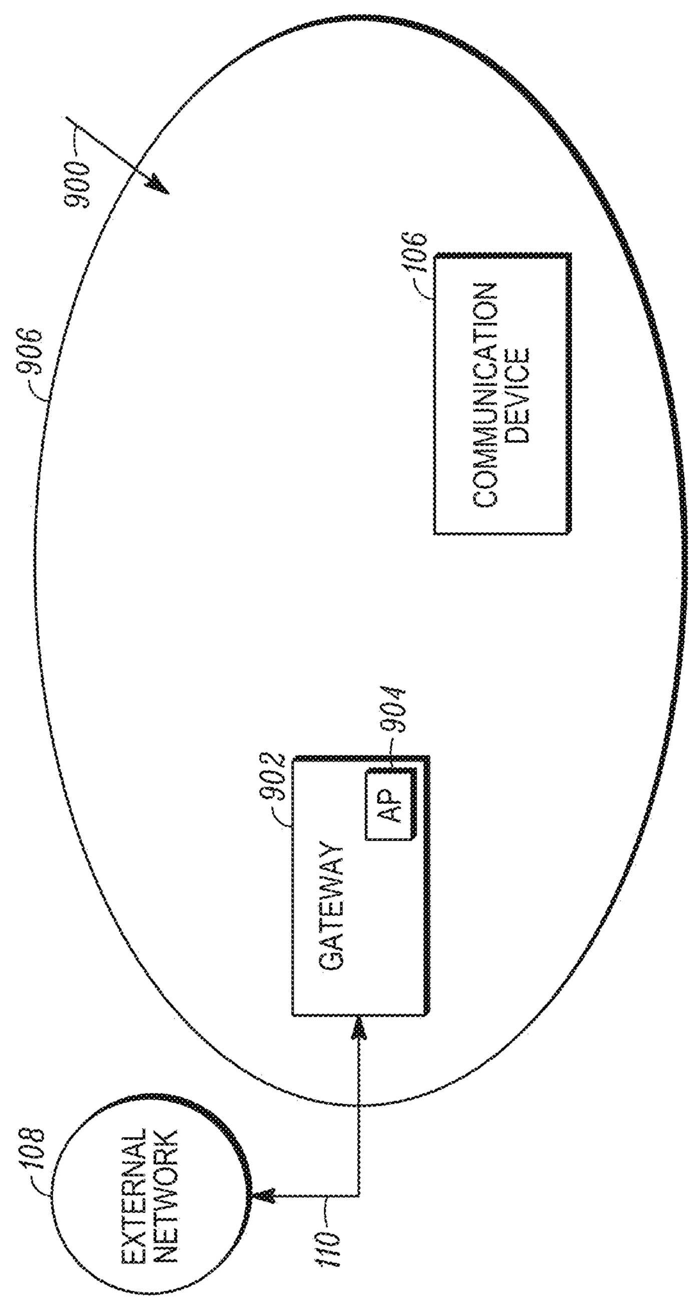
FIG. 9 illustrates another example wireless communication system in accordance with aspects of the present disclosure.

FIG. 9 illustrates another example wireless communication system 900 in accordance with aspects of the present disclosure.

As shown in the figure, wireless communication system 900 differs from wireless communication system 100 of FIG. 1 in that gateway 102 is replaced with a gateway 902 and Wi-Fi APD 104 has been removed.

In this example embodiment, gateway 902 is operable to perform the functions of gateway 102 discussed above, but further includes Wi-Fi access point functionality indicated by Wi-Fi access point component (Wi-Fi APC) 904. In some embodiments. Wi-Fi APC 904 is operable to function in a manner similar to Wi-Fi APD 104 discussed above with reference to FIGS. 1-7. In other embodiments, Wi-Fi APC 904 is operable to function in a manner similar to Wi-Fi APD 802 discussed above with reference to FIG. 8.

In summary, prior art methods for onboarding a Wi-Fi APD include: a manual method that is not automatic, is not end-user friendly and is prone to end-user errors; and a method that includes the use of a QR (Quick response) code, which has a high chance that an incorrect QR code is printed on the Wi-Fi APD or may start fading out or be physically damaged to the point that it is unable to be scanned.

Aspects of the present disclosure provide a system and method to automatically on-board a Wi-Fi APD by broadcasting the onboarding configuration information by way of an IEEE 802.11 beacon management signal. A Wi-Fi communication device may then be used to complete the onboarding procedure, using the on-barding configuration information provided in the beacon management signal. This system and method is automatic, is user friendly, is not prone to end-user errors and will always include the correct onboarding configuration information.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the invention be defined by the claims appended hereto.

We claim:

1. A Wi-Fi access point device for use with a Wi-Fi communication device that is operable to transmit a login signal and to transmit a reconfiguration signal, the Wi-Fi access point device comprising:

a memory having instructions and onboarding configuration information stored therein, the onboarding configuration information including a factory-set network identifier and a factory-set network password; and a processor configured to execute the instructions so as to:

generate an initialization signal;

generate an onboarding signal based on the onboarding configuration information;

transmit the onboarding signal, based on the initialization signal, by way of an IEEE 802.11 beacon management frame, to receive the login signal and to receive the reconfiguration signal; and create a Wi-Fi network based on the login signal and modify the Wi-Fi network.

2. The Wi-Fi access point device of claim 1, wherein the processor is further configured to execute the instructions so as to modify the Wi-Fi network by modifying the onboarding configuration information so as to replace the factory-set network identifier with a new network identifier and so as to replace the factory-set network password with a new network password based on the reconfiguration signal.

3. The Wi-Fi access point device of claim 2, wherein the processor is further configured to execute the instructions so as to generate the onboarding signal by encrypting the onboarding configuration information.

4. The Wi-Fi access point device of claim 3, wherein the processor is further configured to execute the instructions so as to modify the onboarding configuration information so as to replace the new network identifier with the factory-set network identifier and so as to replace the new network password with the factory-set network password.

5. The Wi-Fi access point device of claim 4, wherein the processor is further configured to execute the instructions so as to receive a communication signal from the Wi-Fi communication device and to retransmit the communication signal.

6. The Wi-Fi access point device of claim 2, wherein the processor is further configured to execute the instructions so as to modify the onboarding configuration information so as to replace the new network identifier with the factory-set network identifier and so as to replace the new network password with the factory-set network password.

7. The Wi-Fi access point device of claim 1, wherein the processor is further configured to execute the instructions so as to receive a communication signal from the Wi-Fi communication device and to retransmit the communication signal.

8. A method performed by a processor, and for use with a Wi-Fi communication device that is operable to transmit a login signal and to transmit a reconfiguration signal, the method comprising:

storing, into a memory, onboarding configuration information that comprises a factory-set network identifier and a factory-set network password;

generating an initialization signal;

generating an onboarding signal based on the onboarding configuration information;

transmitting the onboarding signal, based on the initialization signal, by way of an IEEE 802.11 beacon management frame;

receiving the login signal;

creating a Wi-Fi network based on the login signal;

receiving the reconfiguration signal; and modifying the Wi-Fi network.

9. The method of claim 8, wherein the modifying of the Wi-Fi network comprises modifying the onboarding configuration information so as to replace the factory-set network identifier with a new network identifier and so as to replace the factory-set network password with a new network password based on the reconfiguration signal.

10. The method of claim 9, further comprising:

encrypting the onboarding configuration information.

11. The method of claim 10, further comprising:

modifying the onboarding configuration information so as to replace the new network identifier with the factory-set network identifier and so as to replace the new network password with the factory-set network password.

12. The method of claim 11, further comprising:

receiving a communication signal from the Wi-Fi communication device; and retransmitting the communication signal.

13. The method of claim 9, further comprising:

modifying the onboarding configuration information so as to replace the new network identifier with the factory-set network identifier and so as to replace the new network password with the factory-set network password.

14. The method of claim 8, further comprising:

receiving a communication signal from the Wi-Fi communication device; and retransmitting the communication signal.

15. One or more non-transitory tangible computer-readable media having computer-readable instructions stored thereon which, when executed by one or more computer processors, cause the one or more computer processors to execute at least:

storing, into a memory, on boarding configuration information that comprises a factory-set network identifier and a factory-set network password;

generating an initialization signal;

generating an onboarding signal based on the onboarding configuration information;

transmitting the onboarding signal based on the initialization signal, by way of an IEEE 802.11 beacon management frame;

receiving a login signal from a Wi-Fi communication device;

creating a Wi-Fi network based on the login signal;

receiving a reconfiguration signal from the Wi-Fi communication device; and modifying the Wi-Fi network.

16. The non-transitory tangible computer-readable media of claim 15, wherein the modifying of the Wi-Fi network comprises modifying the onboarding configuration information so as to replace the factory-set network identifier with a new network identifier and so as to replace the factory-set network password with a new network password based on the reconfiguration signal.

17. The non-transitory tangible computer-readable media of claim 16, wherein the computer-readable instructions, when executed by one or more computer processors, further cause the one or more computer processors to execute:

encrypting the onboarding configuration information.

18. The non-transitory tangible computer-readable media of claim 17, wherein the computer-readable instructions, when executed by one or more computer processors, further cause the one or more computer processors to execute;

modifying the onboarding configuration information so as to replace the new network identifier with the factory-set network identifier and so as to replace the new network password with the factory-set network password.

19. The non-transitory tangible computer-readable media of claim 18, wherein the computer-readable instructions, when executed by one or more computer processors, further cause the one or more computer processors to execute:

receiving a communication signal from the Wi-Fi communication device; and retransmitting the communication signal.

20. The non-transitory tangible computer-readable media of claim 16, wherein the computer-readable instructions, when executed by one or more computer processors, further cause the one or more computer processors to execute:

modifying the onboarding configuration information so as to replace the new network identifier with the factory-set network identifier and so as to replace the new network password with the factory-set network password.

* * * * *